(12) United States Patent
Urban et al.

(10) Patent No.: US 10,965,938 B2
(45) Date of Patent: Mar. 30, 2021

(54) METHOD AND APPARATUS FOR ENCODING A VIDEO

(71) Applicant: INTERDIGITAL VC HOLDINGS, INC., Wilmington, DE (US)

(72) Inventors: Fabrice Urban, Thorigne Fouillard (FR); Tangi Poirier, Thorigne Fouillard (FR); Fabrice Leleannec, Mouaze (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/340,127

(22) PCT Filed: Aug. 31, 2017

(86) PCT No.: PCT/EP2017/071844
§ 371 (c)(1),
(2) Date: Apr. 7, 2019

(87) PCT Pub. No.: WO2018/065153
PCT Pub. Date: Apr. 12, 2018

(65) Prior Publication Data
US 2020/0014915 A1    Jan. 9, 2020

(30) Foreign Application Priority Data

Oct. 7, 2016 (EP) .................................... 16306323

(51) Int. Cl.
*H04N 19/103* (2014.01)
*H04N 19/119* (2014.01)
(Continued)

(52) U.S. Cl.
CPC ......... *H04N 19/103* (2014.11); *H04N 19/119* (2014.11); *H04N 19/147* (2014.11); *H04N 19/176* (2014.11); *H04N 19/46* (2014.11)

(58) Field of Classification Search
USPC ................................................... 375/240.12
See application file for complete search history.

(56) References Cited

U.S. PATENT DOCUMENTS

| 8,432,970 | B1 | 4/2013 | Cahalan et al. |
| 2013/0188704 | A1* | 7/2013 | Zhou .................... H04N 19/176 375/240.12 |

(Continued)

FOREIGN PATENT DOCUMENTS

| WO | 2014162871 A1 | 10/2014 |
| WO | 2016144695 A1 | 9/2016 |

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Oct. 2014, pp. 1-540.

(Continued)

*Primary Examiner* — Behrooz M Senfi
(74) *Attorney, Agent, or Firm* — Invention Mine LLC

(57) ABSTRACT

A method and an apparatus for encoding a video are disclosed. For at least one block from a picture of said video, a first rate-distortion optimization is performed (602) for determining for a first splitting mode of said block into at least one first subblock, coding parameters of said at least one first subblock. At least one second rate-distortion optimization is performed (609) for determining for at least one second splitting mode of said block into at least one second subblock, coding parameters of said at least one second subblock. A best splitting mode for coding said block is determined (613) according to at least said first rate-distortion optimization and said second rate-distortion optimization, and said block is encoded (616) according to said best splitting mode. While performing (609) said at least one (Continued)

Figure 1:
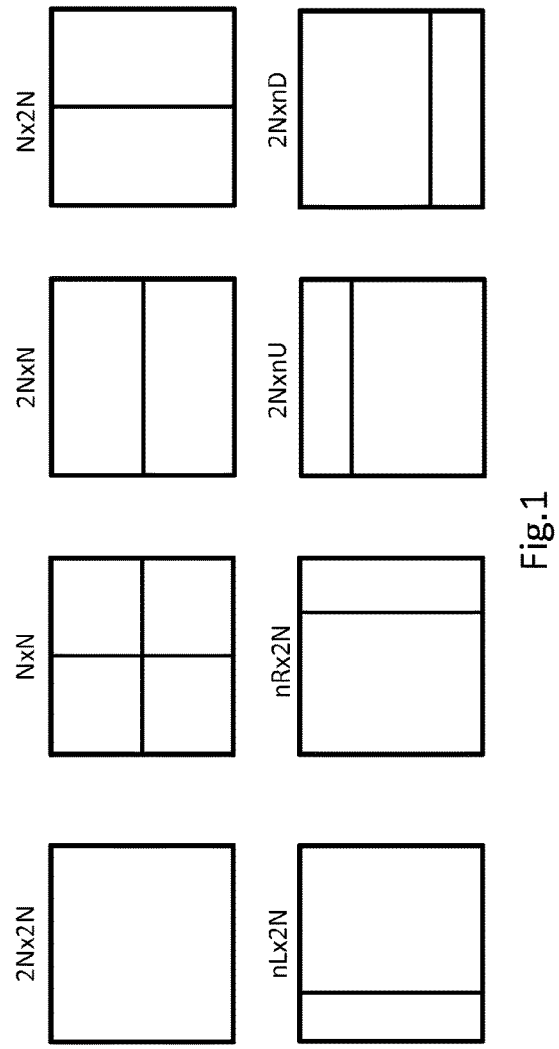

second rate-distortion optimization and when said at least one second subblock is located at a same position in the picture as said at least one first subblock and said at least one second subblock has a same width and same height as said at least one first subblock, at least one coding parameter of said at least one first subblock determined during said first rate-distortion optimization is used (605) for determining said coding parameters for said at least one second subblock.

15 Claims, 9 Drawing Sheets

(51) Int. Cl.
*H04N 19/147* (2014.01)
*H04N 19/176* (2014.01)
*H04N 19/46* (2014.01)

(56) References Cited

U.S. PATENT DOCUMENTS

| 2016/0191920 | A1* | 6/2016 | Kim | H04N 19/176 |
| | | | | 375/240.13 |
| 2018/0077417 | A1* | 3/2018 | Huang | H04N 19/105 |
| 2019/0246107 | A1* | 8/2019 | Leleannec | H04N 19/136 |
| 2019/0281297 | A1* | 9/2019 | Lee | H04N 19/119 |

OTHER PUBLICATIONS

Zhao et al., "Mode-Dependent Non-Separable Secondary Transform", Qualcomm Inc., ITU—Telecommunication Standardization Sector, Study Period 2013-2016, Study Group 16—Contribution 1044, Sep. 2015, 5 pages.
Filippov et al., "Reference Sample Adaptive Filtering for Intra Coding", Huawei Technology Ltd. Co., ITU—Telecommunication Standardization Sector, Study Period 2013-2016, Study Group 16—Contribution 983, Oct. 2015, 4 pages.
Karczewicz et al., "Study of Coding Efficiency Improvements Beyond HEVC", International Organization for Standardization, ISO/IEC JTC1/SC29/WG11, Coding of Moving Pictures and Audio, Document ISO/IEC JTC1/SC29/WG11 MPEG2015/M37102, Geneva, Switzerland, Oct. 2015, 13 pages.
Chen et al., "Further Improvements to HMKTA-1.0", ITU—Telecommunication Standardization Sector, Study Group 16, Question 6, Video Coding Experts Group (VCEG), Document VCEG-AZ07 v2, 52nd Meeting, Warsaw, Poland, Jun. 19, 2015, 9 pages.
Chien et al., "Extension of Advanced Temporal Motion Vector Predictor (ATMVP)", ITU—Telecommunication Standardization Sector, Study Group 16, Question 6, Video Coding Experts Group (VCEG), Document VCEG-AZ10, 52nd Meeting, Warsaw, Poland, Jun. 19, 2015, 4 pages.
Chen et al., "Algorithm Description of Joint Exploration Test Model 3", Joint Video Exploration Team (JVET) of ITU-T SG16 WP3 and ISO/IEC JTC1/SC29/WG11, Document: JVET-C1001 v3, 3rd Meeting, Geneva, Switzerland, May 26, 2016, 37 pages.
Lan et al., "Enhancement of HEVC using Signal Dependent Transform (SDT)", ITU—Telecommunication Standardization Sector, Study Group 16, Question 6, Video Coding Experts Group (VCEG), Document VCEG-AZ08, 52nd Meeting, Warsaw, Poland, Jun. 19, 2015, 7 pages.
Suehring et al., "JVET Common Test Conditions and Software Reference Configurations", Joint Video Exploration Team (JVET) of ITU-T SG16 WP3 and ISO/IEC JTC1/SC29/WG11, Document: JVET-B1010, 2nd Meeting, San Diego, California, USA, Feb. 20, 2016, 4 pages.
Bossen et al., "HM Software Manual", Joint Collaborative Team on Video Coding (JCT-VC) of ITU-T SG16 WP3 and ISO/IEC JTC1/SC29/WG11, Document: JCTVC—Software Manual, Jun. 18, 2015, 27 pages.
Alshina et al., "Known Tools Performance Investigation for Next Generation Video Coding", ITU—Telecommunication Standardization Sector, Study Group 16, Question 6, Video Coding Experts Group (VCEG), Document VCEG-AZ05, 52nd Meeting, Warsaw, Poland, Jun. 19, 2015, 5 pages.
Chen et al., "Coding Tools Investigation for Next Generation Video Coding", Qualcomrn Inc., ITU—Telecommunication Standardization Sector, Study Period 2013-2016, Study Group 16—Contribution 806, Jan. 2015, 7 pages.
Choi et al., "Information on Coding Efficiency Improvements Over HEVC for 4K Content", International Organization for Standardization, ISO/IEC JTC1/SC29/WG11, Coding of Moving Pictures and Audio, Document ISO/IEC JTC1/SC29/WG11 MPEG2015/M37043, Geneva, Switzerland, Oct. 2015, 9 pages.
Liu et al., "Local Illumination Compensation", ITU—Telecommunication Standardization Sector, Study Group 16, Question 6, Video Coding Experts Group (VCEG), Document VCEG-AZ06, 52nd Meeting, Warsaw, Poland, Jun. 19, 2015, 4 pages.
Sullivan et al., "Overview of the High Efficiency Video Coding (HEVC) Standard", IEEE Transactions on Circuits and Systems for Video Tchnology, vol. 22, No. 12, Dec. 2012, pp. 1649-1668.
Rosewarne et al., "High Efficiency Video Coding (HEVC) Test Model 16 (HM16) Improved Encoder Description Update 4", International Organization for Standardization, ISO/IEC JTC1/SC29/WG11, Coding of Moving Pictures and Audio, Document ISO/IEC JTC1/SC29/WG11 N15777, Geneva, Switzerland, Oct. 2015, 62 pages.
An et al., "Block Partitioning Structure for Next Generation Video Coding", MediaTek Inc., ITU—Telecommunication Standardization Sector, Study Period 2013-2016, Study Group 16—Contribution 966 R3, Sep. 2015, 8 pages.
Said et al., "Position Dependent Prediction Combination for Intra-Frame Video Coding", 2016 IEEE International Conference on Image Processing (2016 ICIP), Phoenix, Arizona, USA, Sep. 25, 2016, pp. 534-538.
Lin et al., "Affine Transform Prediction for Next Generation Video Coding", International Organization for Standardization, ISO/IEC JTC1/SC29/WG11, Coding of Moving Pictures and Audio, Document ISO/IEC JTC1/SC29/WG11 MPEG2015/m37525, Geneva, Switzerland, Oct. 2015, 10 pages.
Huang, H. et al., "AHGS: Speed-up for JEM-3.1" Joint Video Exploration Team (JVET) of ITU-T SG 16 WP 3 and ISO/IEC JTC 1/SC 29/WG 11. Oct. 2016, 6 pages.

* cited by examiner

METHOD AND APPARATUS FOR ENCODING A VIDEO

This application claims the benefit, under 35 U.S.C. § 365 of International Application PCT/EP2017/071844, filed Aug. 31, 2017, which was published in accordance with PCT Article 21(2) on Apr. 12, 2018, in English, and which claims the benefit of European Patent Application No. 16306323.3, filed Oct. 7, 2016.

1. TECHNICAL FIELD

A method and an apparatus for encoding a video into a bitstream are disclosed.

2. BACKGROUND

For coding a picture of a video sequence, video compression methods usually divide the picture into a set of blocks of pixels.

In an HEVC video compression standard ("ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), a picture is divided into Coding Tree Units (CTU), which size may be 64×64, 128×128 or 256×256 pixels. Each CTU may be further subdivided using a quad-tree division, where each leaf of the quad-tree is called a Coding Unit (CU). Each CU is then given some Intra or Inter prediction parameters. To do so, a CU is spatially partitioned into one or more Prediction Units (PU), a PU may have a square or a rectangular shape.

The Partitioning of a Coding Unit into Prediction Unit(s) is done according to a partition type, signaled in the bitstream. For Intra coding unit, only the partition types 2N×2N and N×N, illustrated on FIG. 1, are allowed. This means only square Prediction Units are used in Intra Coding Units. On the contrary, Inter Coding Units can use all partition types shown on FIG. 1.

A Quad-Tree plus Binary-Tree (QTBT) coding tool ("*Algorithm Description of Joint Exploration Test Model 3*", Document JVET-C1001_v3, Joint Video Exploration Team of ISO/IEC JTC1/SC29/WG11, 3rd meeting, 26th May-1st Jun. 2015, Geneva, CH), provides a CTU representation for representing picture data in a more flexible way than the units arrangement of the HEVC standard. The Quad-Tree plus Binary-Tree (QTBT) coding tool consists in a coding tree where coding units can be split both in a quad-tree and in a binary-tree fashion. Such coding tree representation of a Coding Tree Unit is illustrated on FIG. 2A, where solid lines indicate quad-tree partitioning and dotted lines indicate binary partitioning of a CU. The splitting of a coding unit is decided on the encoder side through a rate distortion optimization procedure, which consists in determining the QTBT representation of the CTU with minimal rate distortion cost. In the QTBT representation, a CU has either a square or a rectangular shape. The size of coding unit is always a power of 2, and typically goes from 4 to 128. The QTBT decomposition of a CTU is made of two stages: first the CTU is split in a quad-tree fashion, then each quad-tree leaf can be further divided in a binary fashion, as illustrated on FIG. 2B, where solid lines represent the quad-tree decomposition phase and dotted lines represent the binary decomposition that is spatially embedded in the quad-tree leaves.

Figure 3:
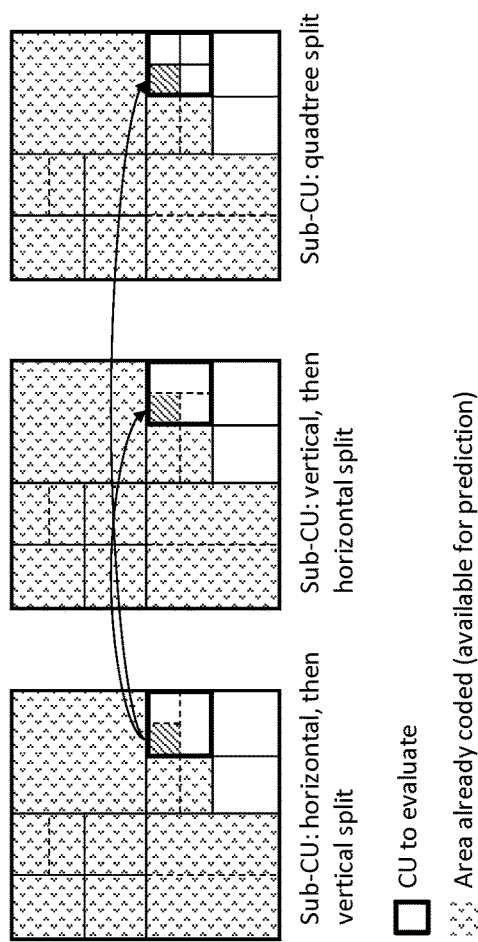

With the introduction of the QTBT tool, a given block may be encoded through different splitting paths, as can be seen on FIG. 3. As shown from FIG. 3, the sub CU (hashed filled on FIG. 3) may be obtained by:

a horizontal splitting of the current CU to evaluate (with bolded boundary on FIG. 3) delivering a top sub CU and a bottom sub CU, followed by a vertical splitting of the top sub CU, or, a vertical splitting of the current CU to evaluate delivering a left sub CU and a right sub CU, followed by a horizontal splitting of the left sub CU, or, a quadtree splitting of the current CU to evaluate.

Therefore, for determining a best coding mode including a splitting configuration for the current CU, the computation of the rate-distortion costs for the top-left sub CU are done multiple times.

3. SUMMARY

According to an aspect of the present principle, a method for encoding a video is disclosed. Such a method comprises, for at least one block from a picture of said video:

performing a first rate-distortion optimization for determining, for a first splitting mode of said block into a first set of at least one first subblock, coding parameters of said at least one first subblock;

performing at least one second rate-distortion optimization for determining, for at least one second splitting mode of said block into at least one second set of at least one second subblock, coding parameters of said at least one second subblock of said at least one second set;

associating a parameter to said at least one first subblock whose a specific value indicates that at least one coding parameter of said first subblock, determined during said first rate-distortion optimization, is used for determining coding parameters for a second subblock;

determining a best splitting mode for coding said block according to said first rate-distortion optimization and said at least one second rate-distortion optimization, encoding said block according to said best splitting mode; wherein the parameter associated to at least one first subblock is set to said specific value:

when a second subblock is located at a same position in the picture as said first subblock;

when said second subblock has a same width and same height as said first subblock; and when said first subblock and said second subblock have a same causal neighborhood comprising data used to predict the subblock or to code a coding parameter for a first or second subblock.

The present disclosure allows coding parameters which have been estimated for a subblock resulting from a first splitting mode to be reused for a subblock resulting from a second splitting mode when this subblocks are located at a same position and have same width and same height. Therefore, computational complexity is reduced.

According to an embodiment, said first subblock and said second subblock have a same causal neighborhood of the subblock when said first subblock is a first subblock of a first set when said first set is ordered according to a scan order.

According to another embodiment of the present disclosure, said specific value indicates that coding parameters for said at least one first subblock are available and that coding parameters for said at least one second subblock are determined to be the same coding parameters as the coding parameters determined for said at least one first subblock.

According to an embodiment, when said coding parameters of said at least one first subblock comprises a splitting configuration of said at least one first subblock, said at least one second subblock inherits (1005) from said splitting configuration.

According to another embodiment of the present disclosure, said specific value of said parameter indicates that coding parameters for said at least one second subblock are determined (802) by searching for best coding parameters for coding said at least one second subblock from the coding parameters determined for said at least one first subblock.

According to this embodiment, the coding parameters of a subblock are partially re-used for another corresponding subblock. As the causal neighbourhood of a subblock changes from one splitting mode to another splitting mode, fully re-using of coding parameters already estimated for a subblock may impact the compression efficiency. But, coding parameters already estimated for a subblock can be re-used partially as a starting point for a coding parameters search when estimating coding parameters for the subblock in the second splitting mode. Therefore, computational complexity is reduced, as the search for coding parameters is not fully performed, but this embodiment has little impact on compression efficiency.

According to another embodiment of the present disclosure, said coding parameters for said at least one first subblock are used (802) only when a no-splitting mode of said at least one second subblock is evaluated.

According to another embodiment of the present disclosure, the method further comprises:

computing (1201) an identifier for said at least one first subblock, said identifier allowing to identify said position, said width and said height of said at least one first subblock and a causal neighborhood of said at least one first subblock indicating at least whether coding parameters for a neighbor of said at least one first subblock have been previously determined, for said at least one first subblock or said at least one second subblock, storing (1204) coding parameters determined for said at least one first subblock, in association with said identifier, for said at least one second subblock, if said parameter associated to said at least one first subblock equals said specific value, using (1205) said identifier for reading stored coding parameters associated to said identifier, the coding parameters for said at least one second subblock being determined to be the read coding parameters.

According to another aspect of the present disclosure, an apparatus for encoding a video is disclosed. Such an apparatus comprises, for at least one block from a picture of said video, a processor configured to:

perform a first rate-distortion optimization for determining, for a first splitting mode of said block into a first set of at least one first subblock, coding parameters of said at least one first subblock;

perform at least one second rate-distortion optimization for determining, for at least one second splitting mode of said block into at least one second set of at least one second subblock, coding parameters of said at least one second subblock of said at least one second set;

associate a parameter to said at least one first subblock whose a specific value indicates that at least one coding parameter of said first subblock, determined during said first rate-distortion optimization, is used for determining coding parameters for a second subblock;

determine a best splitting mode for coding said block according to said first rate-distortion optimization and said at least one second rate-distortion optimization, encode said block according to said best splitting mode;

wherein the parameter associated to at least one first subblock is set to said specific value:

when a second subblock is located at a same position in the picture as said first subblock;

when said second subblock has a same width and same height as said first subblock; and when said first subblock and said second subblock have a same causal neighborhood comprising data used to predict the subblock or to code a coding parameter for a first or second subblock.

The present disclosure also provides a computer readable storage medium having stored thereon instructions for encoding a video according to any one of the embodiments described in the disclosure.

According to one implementation, the different steps of the method for encoding a video as described here above are implemented by one or more software programs or software module programs comprising software instructions intended for execution by a data processor of an apparatus for encoding a video, these software instructions being designed to command the execution of the different steps of the method according to the present principles.

A computer program is also disclosed that is capable of being executed by a computer or by a data processor, this program comprising instructions to command the execution of the steps of a method for encoding a video as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. BRIEF DESCRIPTION OF THE DRAWINGS

Figure 2A:
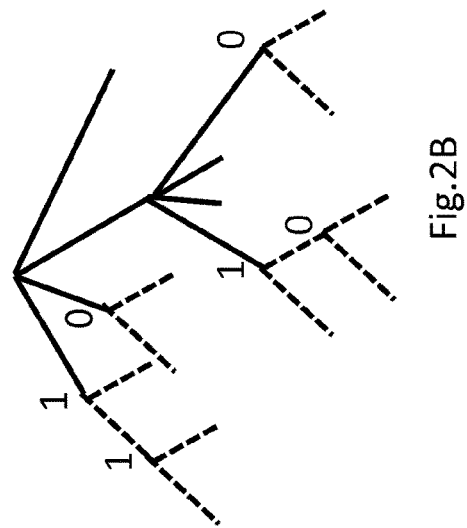
Figure 2B:
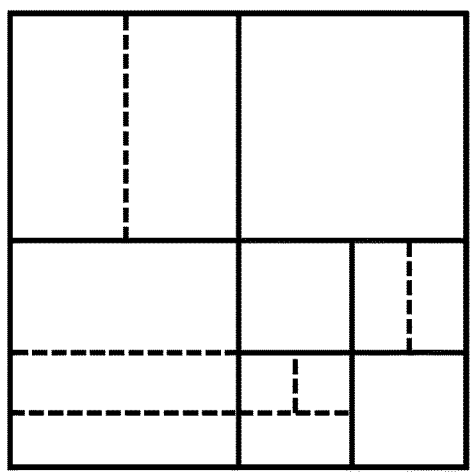
Figure 5:
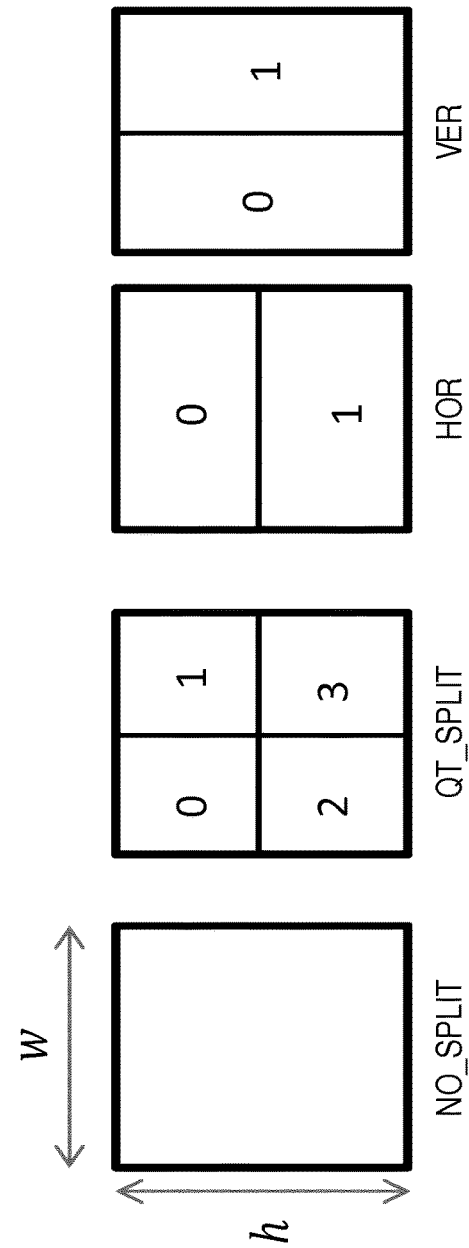
Figure 4:
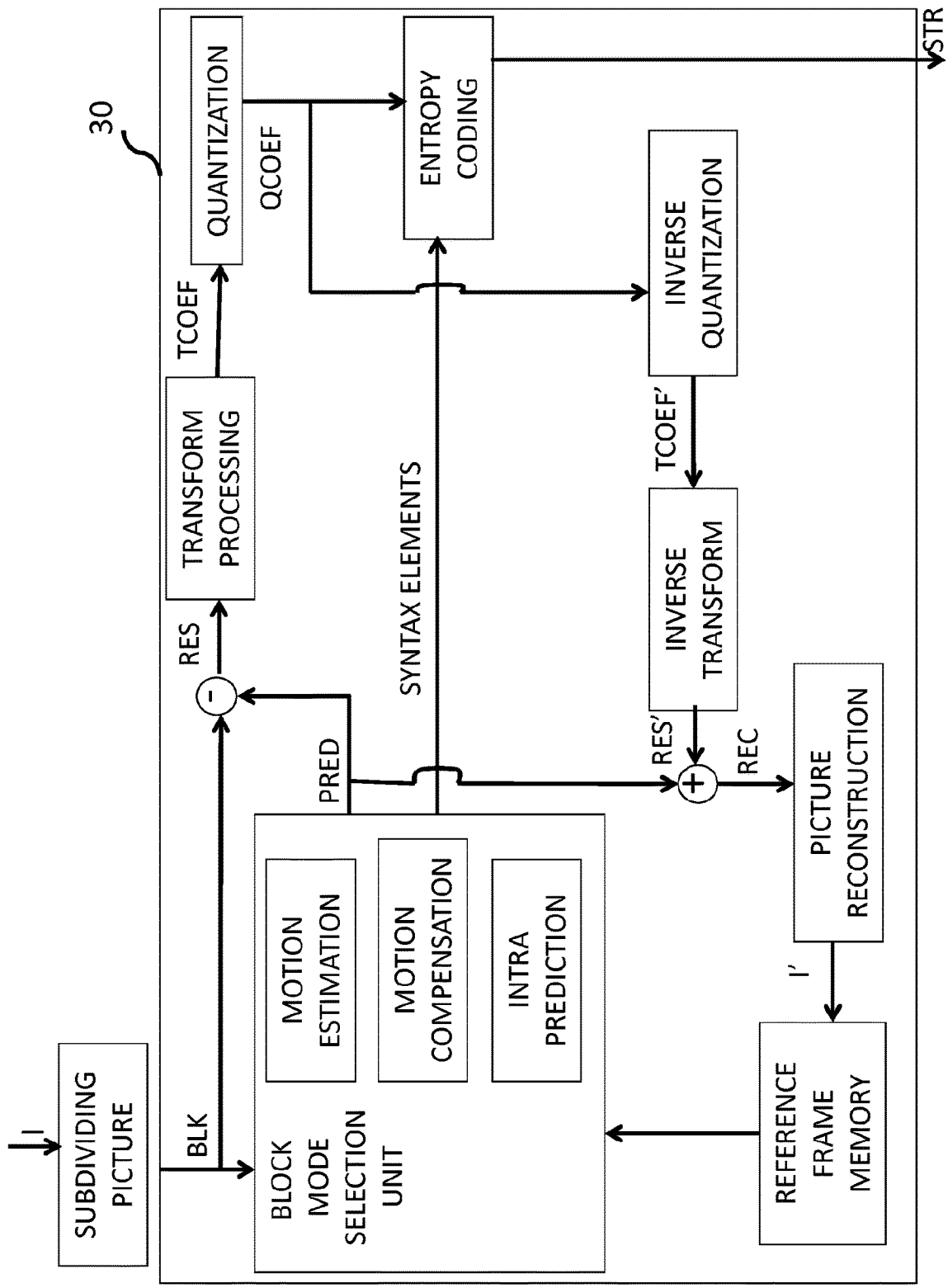
Figure 6:
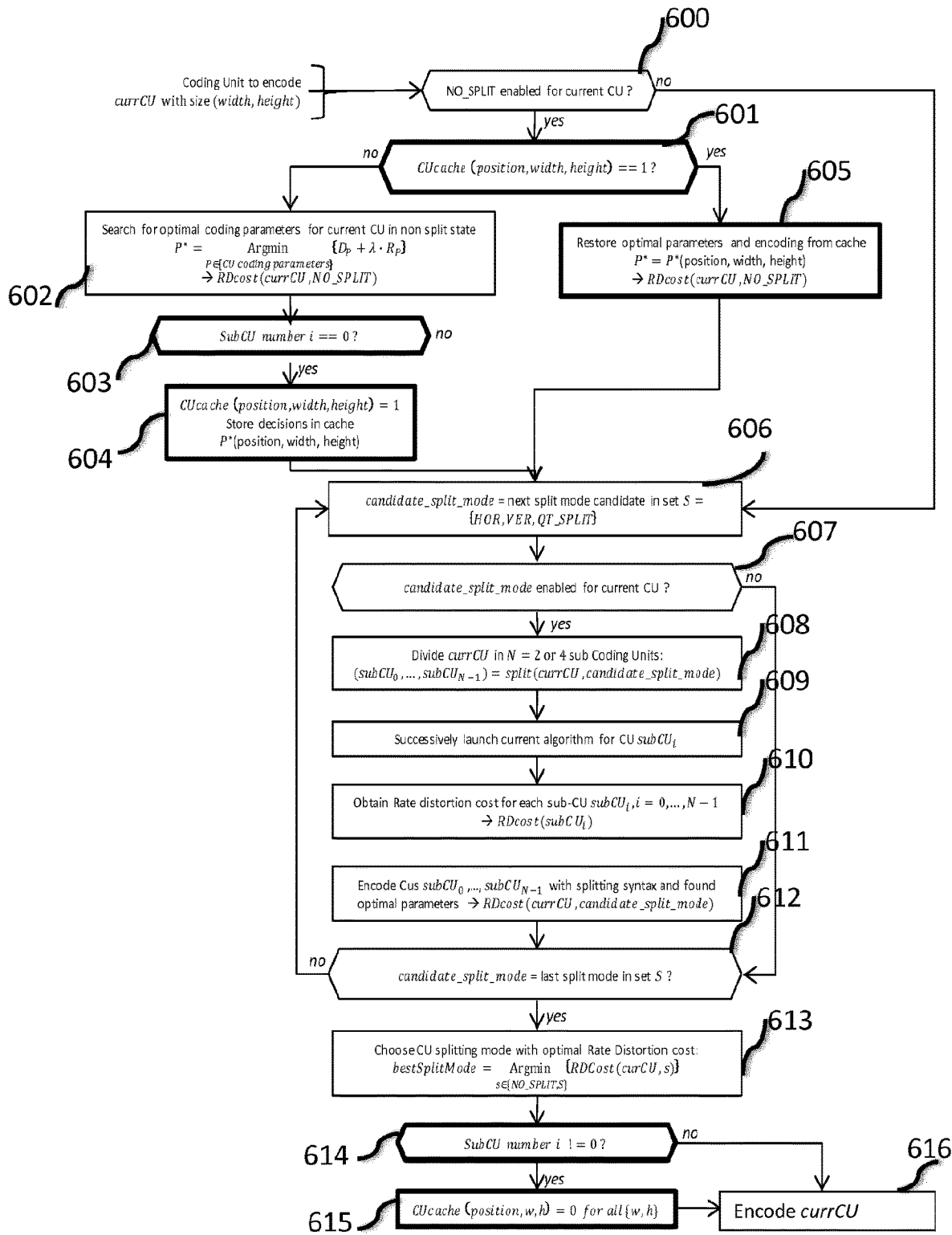
Figure 7:
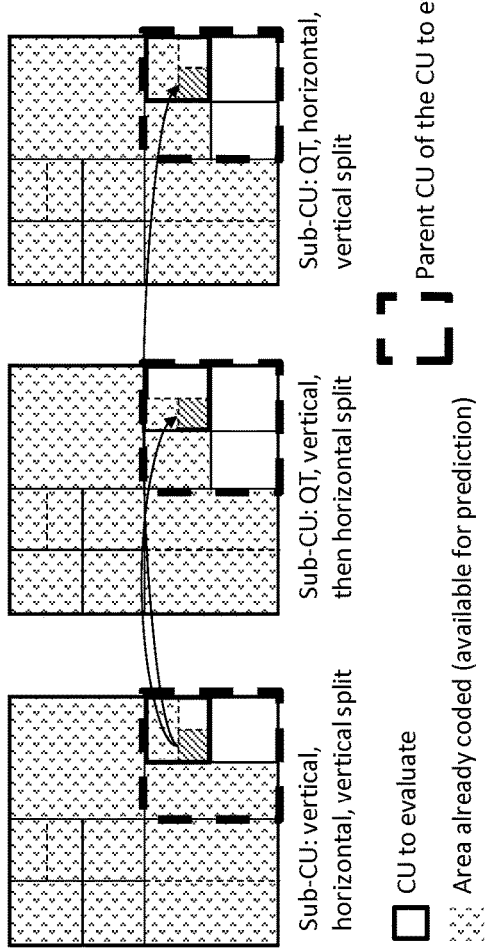
Figure 9:
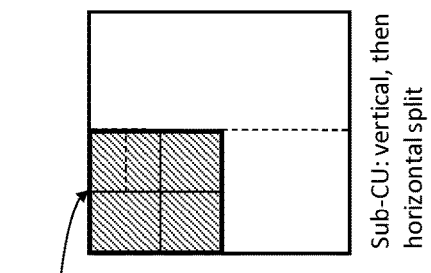
Figure 13:
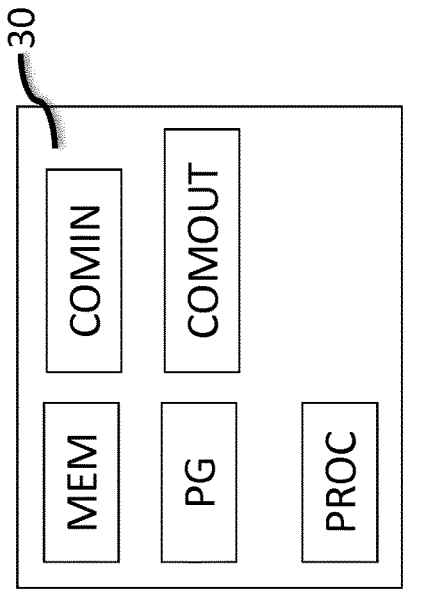
Figure 8:
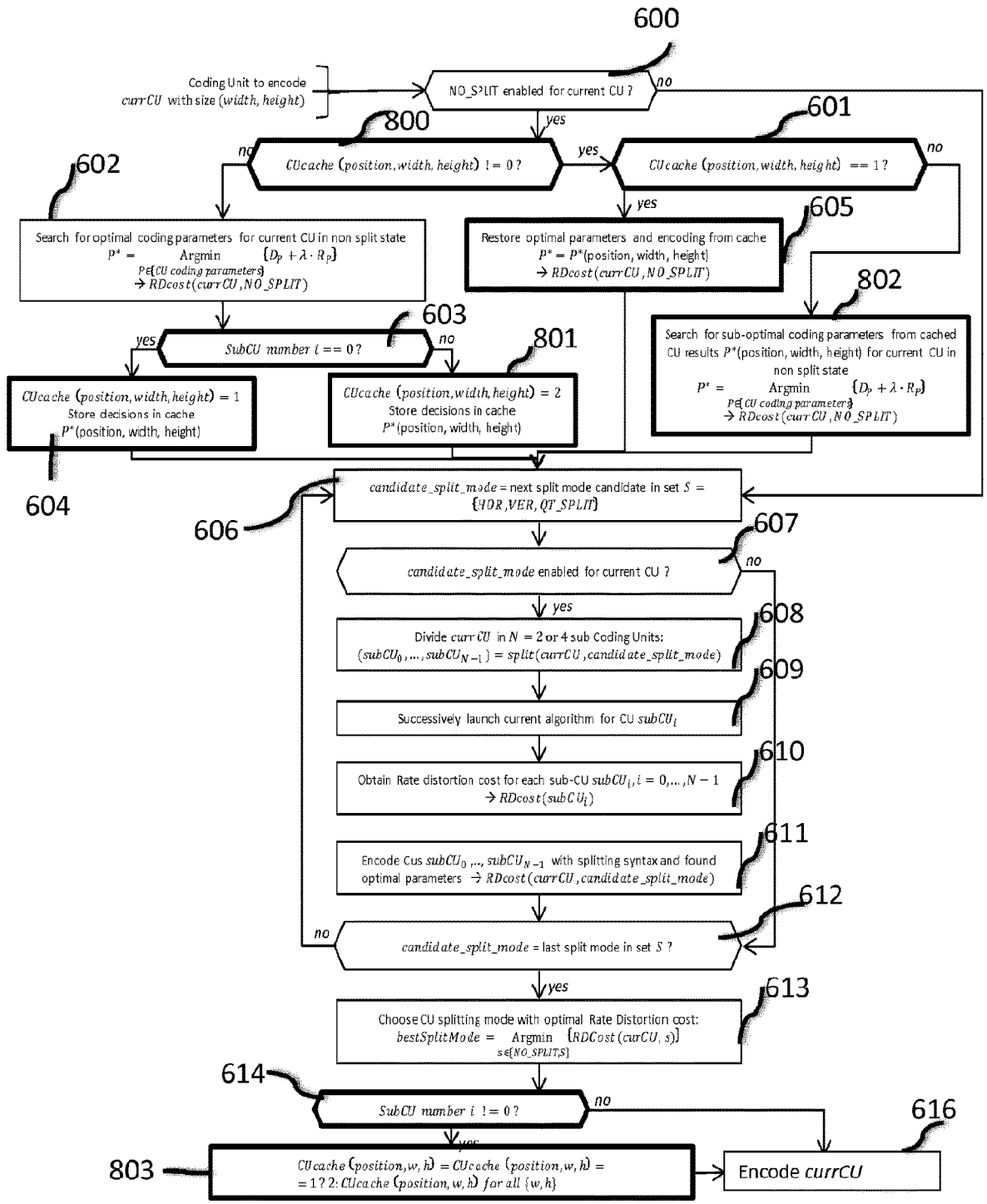
Figure 10:
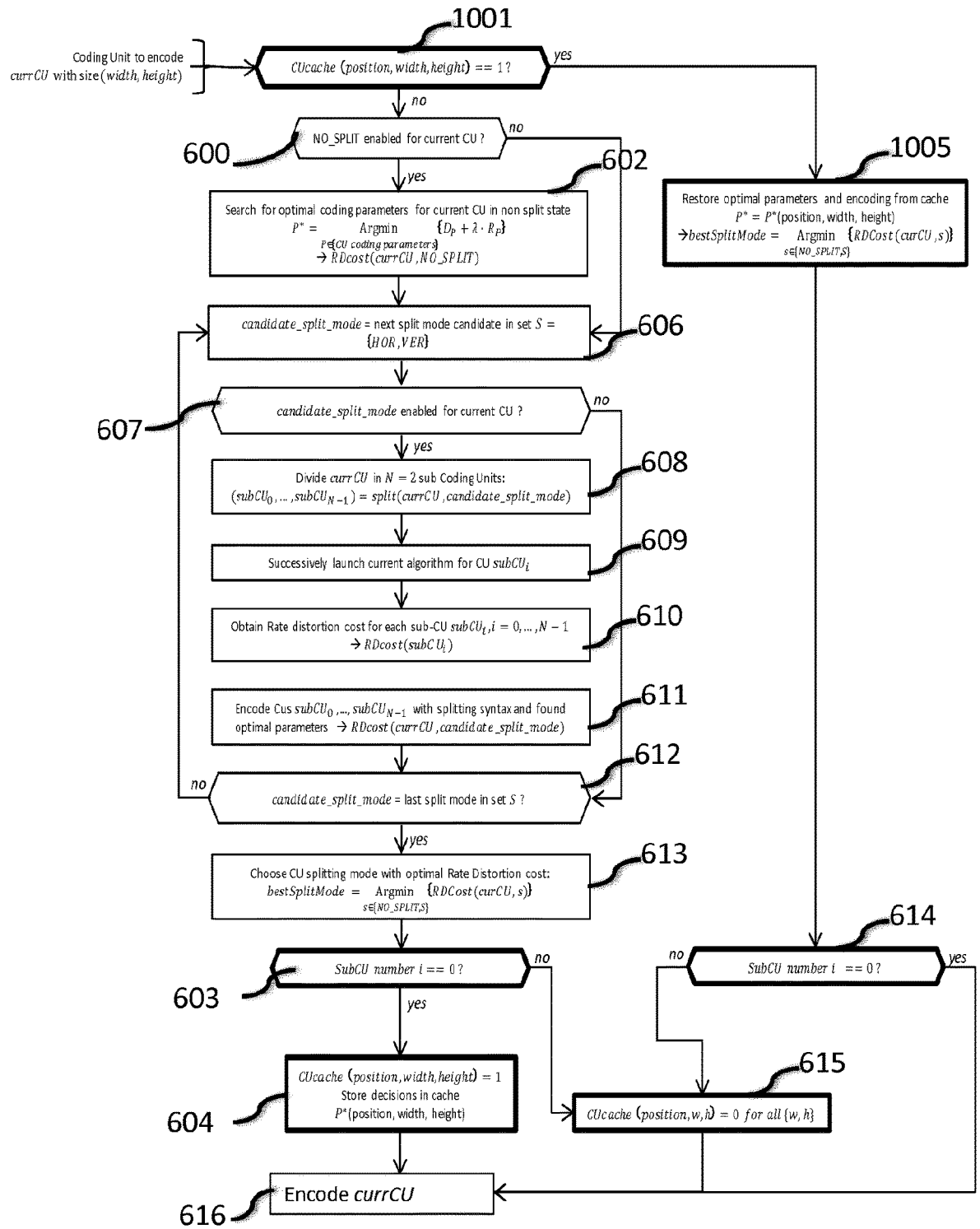
Figure 11:
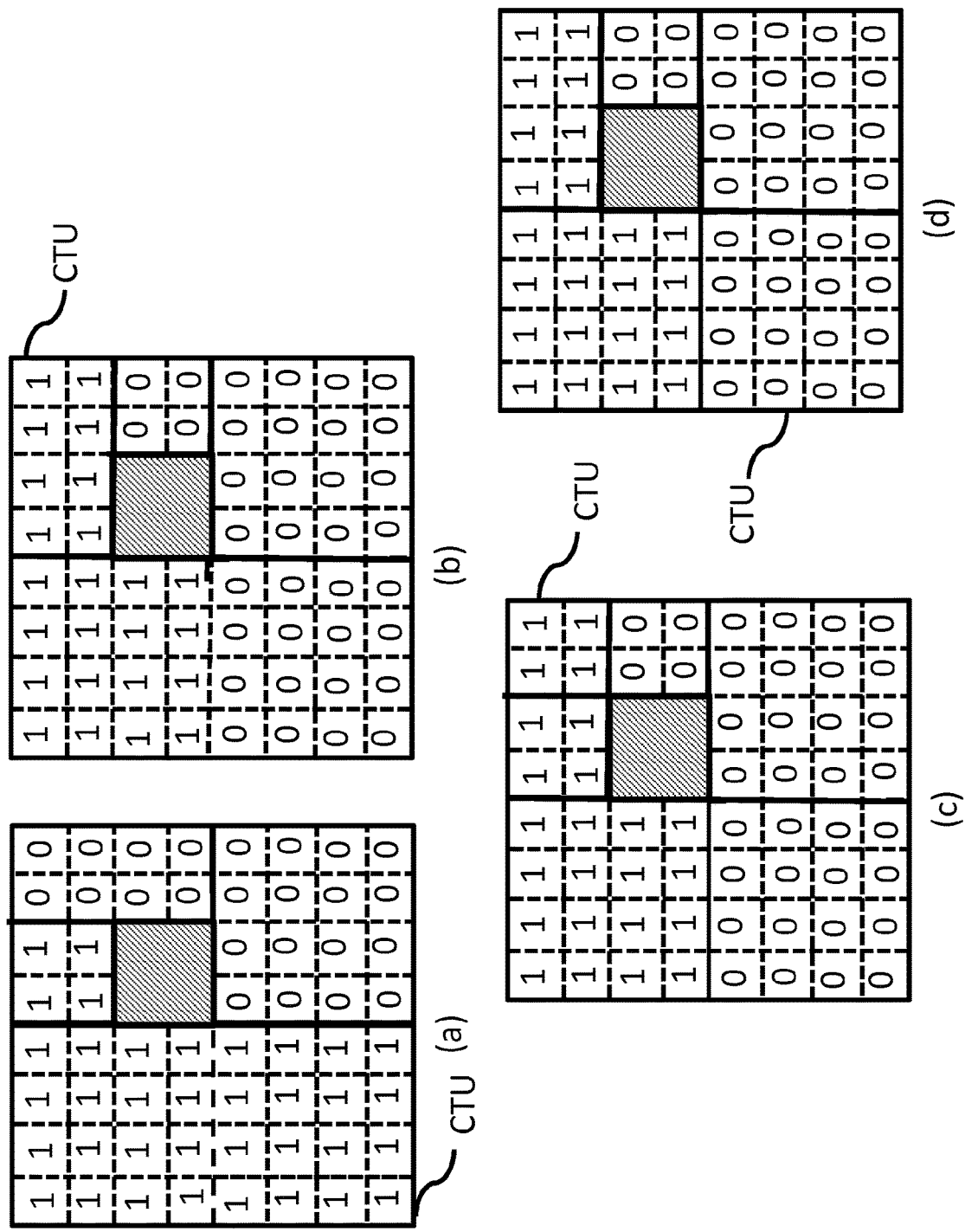
Figure 12:
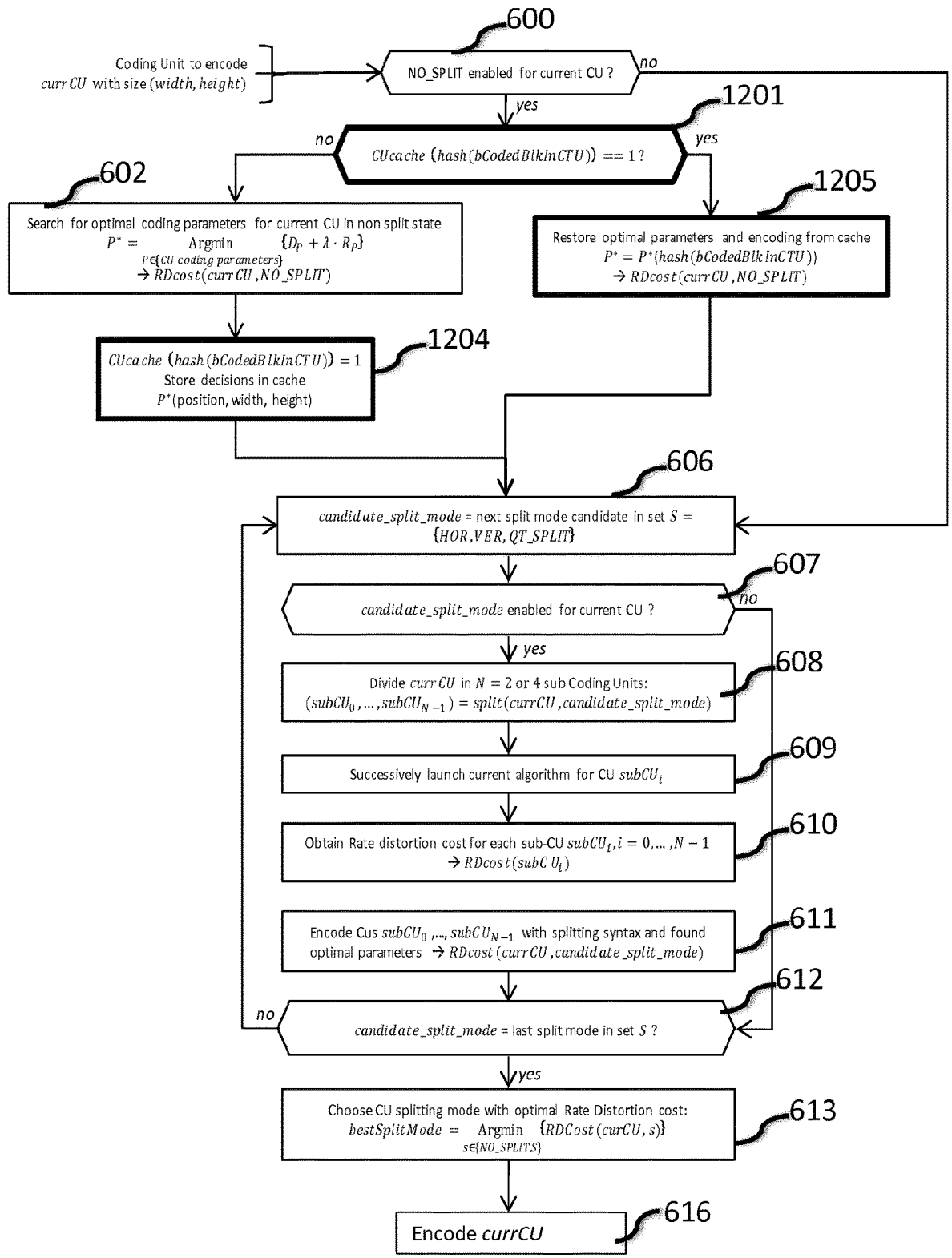

FIG. 1 illustrates exemplary partitioning of a CTU according to the HEVC standard, FIG. 2A illustrates an exemplary CTU partitioning according to the quad-tree and binary tree based method (QTBT), FIG. 2B illustrates an exemplary tree representation of a CTU partitioning according to the quad-tree and binary tree based method (QTBT), FIG. 3 illustrates exemplaries splitting paths for coding a coding unit (CU), FIG. 4 illustrates a block diagram of an exemplary encoder for encoding a video according to an embodiment of the present principle, FIG. 5 illustrates spatial coding structure associated to splitting mode comprises in a set of splitting modes, according to an embodiment of the present disclosure, FIG. 6 illustrates a flow diagram of an exemplary method for encoding a video according to an embodiment of the present disclosure, FIG. 7 illustrates QTBT different splitting paths and corresponding causal neighbourhood according to an embodiment of the present disclosure, FIG. 8 illustrates a flow diagram of an exemplary method for encoding a video according to another embodiment of the present disclosure, FIG. 9 illustrates QTBT different splitting paths leading to a same splitting configuration of a sub CU, FIG. 10 illustrates a flow diagram of an exemplary method for encoding a video according to another embodiment of the present disclosure, FIG. 11 illustrates QTBT different splitting paths leading to a same sub-CU with different causal neighboring states, FIG. 12 illustrates a flow diagram of an exemplary method for encoding a video according to another embodiment of the present disclosure, FIG. 13 illustrates an exemplary encoder that may be used in any one of the embodiments of the present principle.

5. DESCRIPTION OF EMBODIMENTS

The principle disclosed herein is described for encoding a picture from a video sequence, however the disclosed principle may be applied to still digital pictures as well.

To encode a video sequence with one or more pictures, a picture may be partitioned into coding tree units (CTU) of square shape with a configurable size. A consecutive set of coding tree units may be grouped into a slice. A CTU is the root of a QTBT partitioning into Coding Units (CU).

FIG. 4 illustrates a block diagram of an exemplary encoder for encoding a video according to an embodiment of the present principle. The video encoder 30 disclosed here below may be conforming to any video or still picture encoding schemes. In the exemplary video encoder 30, a picture is encoded by the encoder modules as described below.

Classically, the video encoder 30 may include several modules for block-based video encoding, as illustrated in FIG. 4. A picture I to be encoded is input to the video encoder 30. The picture I is first subdivided into a set of blocks by a subdividing module. Each block (BLK) of the picture I is then processed for encoding. In the following, a block may correspond to a coding unit from a QTBT partitioning.

The encoding and decoding processes described below are for illustration purposes. According to some embodiments, encoding or decoding modules may be added, or removed or may vary from the following modules. However, the principle disclosed herein could still be applied to these variants.

The video encoder 30 performs encoding of each block of the picture I as follows. The video encoder 30 comprises a mode selection unit for selecting a coding mode for a block of the picture to be coded, e.g. based on a rate/distortion optimization. Each block is encoded using either an intra or inter mode. The mode selection unit comprises:

a motion estimation module for estimating motion between one current block of the picture to be coded and reference pictures, a motion compensation module for predicting the current block using the estimated motion, an intra prediction module for spatially predicting the current block.

The mode selection unit may also decide whether splitting of the block is needed according to rate/distortion optimization. In that case, the mode selection unit then operates for each subblock of the block BLK.

The block mode selection unit performs the encoding of the block for each candidate coding mode for the block or subblocks of the block when the block has been further split and computes a rate-distortion cost for each of these coding modes. The coding mode providing the lowest rate-distortion cost is selected as the best coding mode for the current block BLK. A candidate coding mode may be any coding mode available for coding the block and depends on the video compression standards used. For instance, for an HEVC coder, candidate coding modes may be chosen from one of the 36 intra prediction modes, an inter prediction mode using an estimated motion vector, a merge coding mode deriving motion information from spatial and/or temporal neighbor blocks, etc.

For determining the best coding mode for a current block, rate-distortion optimization is performed and when splitting of the current block is allowed, all available splitting modes of the current block are evaluated.

FIG. 5 illustrates different splitting modes for a current block. The QT_SPLIT results in 4 subblocks. The HOR and VER respectively results in 2 subblocks. The NO_SPLIT mode corresponds to the case wherein the current block is not split, it can thus be understood as resulting in one subblock of same width and height as the current block. When evaluating a splitting mode for the current block, rate-distortion optimization is performed for each of the subblocks of the current block resulting from the splitting mode and splitting syntax has to be taken into account when determining the rate-distortion cost associated to the splitting mode for the current block.

According to an embodiment, the subblocks of the current block resulting from a splitting mode may be further split according to the available splitting modes or these subblocks. A subblock may be assigned a tree depth to indicate the number of successive splittings needed to reach that subblock.

Back to FIG. 4, once a coding mode is selected for the current block BLK or coding modes for subblocks of the current block BLK are selected, the mode selection unit delivers a predicted block PRED and corresponding syntax elements to be coded in the bitstream for performing the same block prediction at a decoder. When the current block BLK has been split, the predicted block PRED is formed by the set of predicted subblocks delivered by the mode selection unit for each subblocks.

A residual block RES is then obtained by subtracting the predicted block PRED from the original block BLK.

The residual block RES is then transformed by a transform processing module delivering a transform block TCOEF of transformed coefficients. The transform block TCOEF is then quantized by a quantization module delivering a quantized transform block QCOEF of quantized residual transform coefficients.

The syntax elements and quantized residual transform coefficients of the block QCOEF are then input to an entropy coding module to deliver coded data to form the coded bitstream STR.

The quantized residual transform coefficients of the quantized transform block QCOEF are processed by an inverse quantization module delivering a block TCOEF' of dequantized transform coefficients. The block TCOEF' is passed to an inverse transform module for reconstructing a block of residual prediction RES'.

A reconstructed version REC of the block BLK is then obtained by adding the prediction block PRED to the reconstructed residual prediction block RES'.

The reconstructed block REC is stored in memory for use by a picture reconstruction module. The picture reconstruction module performs reconstruction of a decoded version I' of the picture I from the reconstructed blocks REC. The reconstructed picture I' is then added to a reference picture memory for later use as a reference picture for encoding the following pictures of the set of pictures to code or for encoding subsequent blocks of the picture I.

As disclosed with FIG. 3, for determining a best coding mode a current block, the rate-distortion optimization for subblocks resulting from a splitting mode of the current block is done multiple times. A method for encoding a video is disclosed below wherein for a subblock resulting from a first splitting mode of the current block and corresponding to a subblock resulting from a second splitting mode of the current block, a rate-distortion optimization performed for that subblock may re-use coding parameters previously estimated for that subblock when the first splitting mode of the current block has been evaluated.

According to an embodiment of the present disclosure, a parameter CUcache(p, w, h) is associated to a subblock resulting from a splitting of the current block, or from the splitting of a subblock of the current block. Such a parameter indicates whether coding parameters have already been estimated for that subblock or not. Such a parameter is associated to each subblock at position p, with width=w and height=h, said position p is indicated by the position of the top-left pixel of said subblock.

In the following, the terms block or CU may be used indifferently to designate a block.

The terms subblock or sub-CU may be used indifferently to designate a subblock, wherein subblock is a block at a higher depth level resulting from a splitting of a parent block into at least one subblock.

The use of the terms subblock or block depending on the depth the entity is considered. When splitting a block into a set of subblocks, the block being split has a lower depth (for instance 0), than a subblock resulting from the splitting (for instance depth of a subblock is 1). When a subblock is further split, depth of the resulting subblocks is increased. In the present disclosure, rate-distortion optimization is performed in a recursive fashion on the subblocks of the splitting tree. Therefore, a subblock resulting from a splitting of a block may be referred as a block when the splitting of this subblock is considered.

FIG. 6 illustrates a flow diagram of an exemplary method for encoding a video according to an embodiment of the present disclosure. According to this embodiment, the parameter CUcache can take two possible values, for instance 0 or 1.

The value 0 indicates that no coding parameters for the subblock is available. The value 1 indicates that coding parameters for the subblock are available (provided by an evaluation of a splitting mode of the current block previously performed) and that such coding parameters should be fully re-used when evaluating another splitting mode.

The input to the process disclosed on FIG. 6 is an input coding unit to compress with a position (indicated by the position of the top-left pixel in the current picture) and a size represented by width and height.

The input to this algorithm is an input coding unit currCU to encode, such an input CU currCU having a size (width, height) along an horizontal and vertical direction respectively and a position (position) in the current picture.

In step 600, it is first checked whether a NO_SPLIT splitting mode is allowed for the currCU. In case the NO_SPLIT splitting mode is allowed, the process passes to step 601, otherwise, the process passes to step 606.

According to this embodiment, in step 601, the CUcache parameter associated to the current CU is checked to determine whether this CU has already been computed (value 1).

If so, in step 605, results are retrieved from the cache memory. That is prediction modes and RDcost stored in memory are copied in the current coding parameters of the current CU and the process goes to step 606.

If the current block has not already been computed (value 0 of CUcache), all the coding modes are evaluated as follows.

In step 602, the NO_SPLIT splitting mode is evaluated as a candidate coding structure for the current CU currCU. The NO_SPLIT splitting mode means that the current CU is not divided into sub-CU, thus the prediction, transform, quantization and entropy coding steps are applied on the current block with size (width, height).

Therefore, in step 602, the best coding modes (prediction mode, intra prediction angle, intra smoothing mode, motion vector, transform index . . . ) is being searched for the current coding unit. The optimal CU coding parameters are noted P*, and correspond to the set of coding parameters with minimal rate distortion cost $D_p + \lambda \cdot R_p$, where $D_p$ is the distortion, $R_p$ is the rate cost (number of bits to code current CU), and $\lambda$ is the Lagrange parameter.

In step 602, a resulting rate distortion cost associated to current CU, in the NO_SPLIT splitting configuration, noted RDcost(currCU,NO_SPLIT) is computed by encoding the current CU with the optimal coding parameters P* and also by integrating the rate cost associated to the splitting syntax used to signal the NO_SPLIT configuration for the current CU.

During these steps, in particular when coding the current CU with parameters P*, a rectangular block is characterized in a term of relative shape (here shape means parameter related to the CU state that results from a series of splitting operations). In the current standard, the block is often characterized by his QT depth (where QT depth is the number of successive QT splits). This is used for example to select the contextual information of the entropy coding of coding parameters associated with the block.

As can be seen on FIG. 3, the current sub-CU to evaluate can have different splitting modes, leading to different QT depth or BT depth values (BT depth is the number of successive BT splits). For example, the left and middle case leads to a QT depth of 1, whereas the right case leads to a QT depth of 2. Using the QT depth to select the contextual information of the entropy coding leads to different entropy codings. Therefore, reference is no more made to the depth of the CU, but to the width, or the height of the current CU. Using the width or the height of the block to characterize its shape guarantees that the same contextual information is used to code or decode those coding parameters.

For example, coding parameters that are signaled based on shape-dependent contextual information may concern the flag that indicates the use of adaptive transform of the coefficients of the current CU.

In step 604, mode decision and RDcost estimated at step 602 are stored in a cache memory for further use.

Coding parameters estimated for a subblock resulting from other splitting modes are the same when the causality of the subblock is the same. By causality, it is to be understood the causal neighborhood of the subblock comprising data used to predict the subblock or to code a coding parameter for the subblock. Such data may be reconstructed pixel values on top and left side of the subblock, intra prediction mode, motion vector, etc. . . . .

The causality of the current CU is not changed for example for a first sub-CU resulting from a splitting of a parent CU.

Therefore, according to an embodiment of the present disclosure, before step 604, it is checked in step 603 whether the current CU under evaluation is a first sub-CU from the sub-CUs resulting from a splitting of a parent CU, according to a scanning order of the sub-CUs resulting from the splitting of the parent CU. For instance, it is checked if the position of the sub-CU is the same as the position of its parent CU, i.e. an index of the sub CU is 0 or not. Exemplary scanning orders of the sub-CUs resulting from a splitting of a parent CU are illustrated on FIG. 5 for the splitting modes HOR, VER, QT_SPLIT. On FIG. 5, the number inside a sub-CU represents the order of the sub CU in the scanning order. Other scanning orders are also possible.

If the current CU under evaluation is not a first sub-block from the sub-CUs resulting from a splitting of a parent CU, then the process passes to step 606.

Otherwise, the process goes to step 604.

A next stage of the process consists in successively evaluating all candidate splitting modes for the current CU. All binary and quaternary splitting modes correspond to the following set:

S={HOR,VER,QT_SPLIT}

The spatial splitting of an exemplary square coding unit for each of these splitting modes is illustrated by FIG. 5.

In step 606, a candidate splitting mode is selected from the set of splitting mode, for instance the first splitting mode in the list.

For each candidate splitting mode, the following steps are performed.

In step 607, it is determined if the current candidate splitting mode is allowed for the current CU. If the candidate splitting mode is a binary split mode (HOR or VER), this test consists in checking first, that the size of the current CU is higher than a minimum CU size, either in width or height, second that the size of current CU is smaller than a maximum CU size, either in width or height, and third, that the number of successive binary splits is lower than a maximum number of binary splits by:

((height>uiMinBTSize || width>uiMinBTSize) &&
    width<=uiMaxBTSize &&
    height<=uiMaxBTSize &&
    uiBTDepth<uiMaxBTD)

where
uiMinBTSize represents a minimal size allowed for a coding unit in the binary tree,
uiMaxBTSize represents a maximal size allowed for a coding unit in the binary tree,
uiBTDepth represents the depth of the current CU in the binary tree (i.e. the number of successive binary splits to obtain the current CU from a parent CU) whose configuration is being determined by the on-going process,
uiMaxBTD represents the maximal allowed depth of a binary tree.

If the candidate splitting mode is not allowed, then the process directly goes to step 612.

If the candidate splitting mode is allowed, then the process passes to step 608.

In step 608, the current CU is divided into 2 or 4 smaller sub-CUs, according to the current candidate splitting mode. If the splitting mode corresponds to a binary splitting configuration, then 2 sub-CUs are obtained, with respective size according to the block spatial division illustrated by FIG. 3. In case the current candidate splitting mode is equal to QT_SPLIT, then 4 sub-CUs with a same size (width/2, height/2) are obtained.

In step 609, once the sub coding units are obtained, a loop over each obtained sub-CU is performed. For each obtained sub-CU, the current process of FIG. 6 is called in a recursive way. This results in obtaining a set of optimal coding parameters for each obtained subCU.

In step 610, minimum rate-distortion costs, noted RDCost (subCU$_i$), ∀i=0, . . . , N−1, are obtained for each subCU, according to the set of optimal coding parameters obtained for each obtained subCU.

In step 611, the current CU currCU is encoded by coding the sub coding units subCU$_i$,i=0, . . . , N−1, together with the splitting syntax needed to indicate how the current CU is dividing into sub coding units, according to the current candidate splitting mode. A Rate Distortion cost associated to the current CU and the current candidate splitting mode, noted RDcost (currCU,candidate_split_mode), is thus obtained.

In step 612, it is checked whether all available candidate splitting modes have been evaluated. If this is not the case, the process passes to step 606. Otherwise, the process passes to step 613.

In step 606, the next candidate splitting mode from the set S of candidate splitting modes is selected and the process is iterated from step 607 for such a next candidate splitting mode.

In step 613, all available candidate splitting modes have been evaluated. The candidate splitting mode bestSplitMode with the lowest RD cost is chosen among all candidate splitting modes that have been evaluated, i.e. for which a rate-distortion cost has been computed and stored.

If the current sub-CU being processed is not the first one, the causality may change next time the process is called for this position (i.e. for other splitting mode of the parent CU). In that case, the modes can not be reused in a straightforward manner.

In step 614, it is checked whether the current sub CU is a first sub CU or not (i equals 0 or not).

If so, in step 615, the cache is cleared for the current position and the parameter CUcache associated to the current sub CU is set to 0, for all the block sizes.

In step 616, the current CU is encoded with the best splitting configuration bestSplitMode, for instance according to encoding process disclosed in FIG. 4.

According to an embodiment, during this step, all characterization of the current CU by a QT or BT depth is replaced by the width or the height of the block. For example, contextual information of the entropy coding is not selected based on the QT depth of the current block but on the width of the current block.

As disclosed on FIG. 7, several splitting paths may lead to a subblock wherein the causal neighborhood does not significantly change.

As shown from FIG. 7, the sub CU (hatshed filled on FIG. 7) may be obtained from a parent CU (represented by bolded dotted lines on FIG. 7) split according to the following splitting paths:

a vertical splitting of the parent CU delivering a left sub-CU and a right sub-CU, followed by an horizontal splitting of the right sub-CU delivering a top sub-CU (being the current CU to evaluate, represented with bolded boundaries on FIG. 7) and a bottom sub-CU, followed by an horizontal splitting of the current CU to evaluate delivering a top sub CU and a bottom sub CU, followed by a vertical splitting of the bottom sub CU delivering a left sub CU (being the current sub-CU to evaluate) and a right sub-CU, or, a quadtree splitting of the parent CU delivering 4 sub-CUs: top-left sub-CU, top-right sub-CU, bottom-left sub-CU and bottom right sub-CU, the current CU to evaluate being the top-right sub-CU, followed by a vertical splitting of the current CU to evaluate delivering a left sub-CU and a right sub-CU, followed by an horizontal splitting of the left sub-CU delivering a top sub-CU and a bottom sub-CU (being the current sub-CU to evaluate), or, a quadtree splitting of the parent CU delivering 4 sub-CUs: top-left sub-CU, top-right sub-CU, bottom-left sub-CU and bottom right sub-CU, the current CU to evaluate being the top-right sub-CU, followed by a horizontal splitting of the current CU to evaluate delivering a top sub-CU and a bottom sub-CU, followed by a vertical splitting of the bottom sub-CU delivering a left sub-CU (being the current sub-CU to evaluate) and a right sub-CU.

Dotted areas on FIG. 7 illustrate area already coded, that is the areas available for prediction. It can be seen that according to different splitting paths to reach a target sub-CU to evaluate, the areas available for prediction does not change significantly.

Therefore, according to another embodiment of the present disclosure, some computed coding parameters can be reused for a sub-CU although the causal neighborhood of the sub-CU has changed. Such an embodiment has a limited impact on compression performances, while providing a significant encoding time reduction.

According to this embodiment, coding parameters estimated for a sub-CU can be fully re-used as previously computed during preceding rate-distortion optimization (performed for a previously evaluated splitting mode of a parent CU) or can be partially re-used. Partially re-using coding parameters should be understood as using already estimated coding parameters for searching new coding parameters. This can be done by using some or all of the already estimated coding parameters as a starting point for a search of optimal coding parameters for the sub-CU under evaluation. In other words, the coding parameters for the sub-CU are copied from the already estimated coding parameters but these already estimated coding parameters are used for searching new coding parameters. Or, a subset of the already estimated coding parameters can be copied and used as new coding parameters, for instance for chrominance components of the sub-CU, already estimated intra prediction direction may be re-used from the current sub-CU, although for luminance component, the intra prediction direction is searched again.

This embodiment allows reducing computations but avoids to perform complete coding parameters search.

According to this embodiment, the parameter CUcache associated to a sub-CU may take 3 possible values, for instance 0 and 1 may have a same meaning as disclosed with FIG. 6, and a third value of 2 indicates that coding parameters already estimated are used as a starting point or to reduce the search ranges of the coding parameters when estimating the new coding parameters for the sub-CU.

This embodiment is illustrated on FIG. 8 wherein steps with similar references as in FIG. 6 are applied similarly.

According to this embodiment, in step 800, it is checked whether the parameter CUcache associated to the current sub-CU under evaluation (position, width, height), is 0 or not.

If the parameter CUcache is not 0, then the process goes to step 601 wherein it is checked if the parameter CUcache is 1 or not. If so, the process goes to step 605 to restore the previously estimated coding parameters for the current sub-CU. Otherwise, the parameter CUcache has a value equal to 2, therefore the process goes to step 802.

In step 802, when the parameter CUcache has a value 2 for the current sub CU, already estimated coding parameters are partially re-used in the NO_SPLIT splitting mode of the current sub-CU.

The best coding parameters, noted P* (prediction mode, intra prediction angle, intra smoothing mode, motion vector, transform index . . . ) are being searched for the current sub-CU. A difference from the full rate-distortion optimization search is that the search space is reduced, and constrained by previously coded block of the same size at the same position. Any number of already computed parameters can be re-used. For example, but not limited to:

Only intra direction prediction,

Intra direction prediction, and PDPC index, (PDPC means Position Dependent Predictor Combination, and consists in spatially predicting, on a per-sample basis, a sample as a weighted combination of reference samples respectively located on the same x- and y-picture coordinates as the predicted samples), Prediction mode (intra/inter), motion vectors, and intra prediction direction, All modes re-used, except the ones that depend on the coefficients (for instance, the RSAF decision loop must be re-computed because the filter index uses bit hiding that depends on coded residual coefficients).

According to this embodiment, the splitting mode candidates (HOR, VER, QT_SPLIT) are explored as disclosed in FIG. 6.

At step 800, when the parameter CUcache is 0, the process goes to step 602 where full search for determining optimal coding parameters is performed.

In step 801, when the current sub-CU is not a first sub-CU (index of sub-CU is not 0), the parameter CU-cache is set of the value 2 and the coding parameters estimated at step 602 are stored in a cache memory.

According to this embodiment, the cache memory and the parameter CUcache is updated at the end of the process.

In step 614, it is checked if the current sub-CU is a first sub-CU (index of sub-CU is 0).

If the current sub-CU being processed is not the first sub-CU (i !=0), the causality may change next time the process is called for this position (that is when evaluating other splitting mode of the parent CU). Therefore, the modes can not be reused in a straightforward manner. Therefore, in step 803, the parameter CUcache is changed from 1 to 2 for the current position, for all the block sizes, and unchanged if its value is 0 or 2.

FIG. 9 illustrates different splitting paths leading to a same splitting configuration of a sub CU. On FIG. 9, a current sub-CU to evaluate is shown filled with hatshed lines. It can be seen from FIG. 9, that even if different splitting paths of the parent CU of the current sub-CU lead to the current sub-CU, a same splitting configuration of the current sub-CU is found. As illustrated on FIG. 9, the current sub-CU can be obtained by:

a horizontal splitting of the current CU, followed by a vertical splitting of the top sub-CU or, a vertical splitting of the current CU, followed by a horizontal splitting of the left sub-CU.

In both splitting paths, the current sub-CU is split into 4 sub-CUs and the top-right sub-CU has been further split horizontally.

According to another embodiment, coding parameters estimated at a higher depth for a sub-CU are stored and re-used, including splitting configuration of the sub-CU.

According to this embodiment, each time a block of the same size as previously encountered at the current position is found, the splitting configuration and coding parameters of the block are reused.

This embodiment is illustrated on FIG. 10 wherein steps with similar references as in FIG. 6 are applied similarly.

For simplicity, only the differences between the embodiment disclosed on FIG. 10 and the embodiment disclosed on FIG. 6 are discussed.

According to the embodiment disclosed on FIG. 10, step 1001 checking if the parameter CUcache associated to the current CU under evaluation is 1 is performed at the beginning of the process, before step 600. In this way, when the value of the parameter CUcache is 1, in step 1005, coding parameters already estimated for the current CU are restored (in a similar manner as in step 605 disclosed with FIG. 6) and the rate-distortion optimization for determining coding parameters and a best splitting mode for the current CU is by-passed.

Furthermore, at step 1001, when the parameter CUcache associated to the current CU under evaluation is not 1, the rate-distortion optimization process for determining coding parameters and a best splitting mode for the current CU is performed similarly as with FIG. 6, with the difference that step 603 and 604 are performed at the end of the process so that the whole splitting configuration and associated coding parameters estimated for the current CU are stored in cache memory if the current CU is a first sub-CU of a parent CU (i=0 at step 603). According to a variant of this embodiment, to improve compression efficiency, some normative and syntax limitations of current video compression standard should be removed. For instance, according to the current QTBT tool, quadtree splitting is not allowed after a binary splitting. Furthermore, according to the current QTBT tool, the binary tree depth is limited. However, the order of the coding tree exploration has an impact on the datas being stored in the memory cache. According to this variant, the maximum Binary Splitting Depth limitation is removed or set to a larger value, so that a sub-CU issued from a binary splitting may be further split. Furthermore, according to this variant, the Quadtree limitation is also removed, including the associated QTSplit syntax. According to this variant, all the quadtree splitting can be obtained with binary tree syntax, for instance by horizontal splitting followed by vertical splitting of the top and bottom sub-CUs.

According to another embodiment of the present disclosure, cache memory is optimally allocated and used so that already estimated coding parameters can be optimally re-used each time it is applicable.

According to this embodiment, estimated coding parameters are stored in cache memory each time a current CU might be re-used, and without overwriting existing coding parameters already estimated for the current CU that might be re-used later.

This embodiment is compatible with the embodiments disclosed above.

This embodiment is illustrated on FIG. 12 wherein steps with similar references as in FIG. 6 are applied similarly. For simplicity, only the differences between the embodiment disclosed on FIG. 12 and the embodiment disclosed on FIG. 6 are discussed.

According to the embodiment disclosed on FIG. 12, a unique identifier (hash(bCodedBlkInCTU) on FIG. 12) is computed at step 1201. Such an identifier allows to identify the position, width and height of the current CU, and a causal neighbourhood of the current CU. Such a causal neighbourhood indicates whether coding parameters for a neighbour CU of the current CU have been previously determined.

Therefore, several sets of coding parameters for a current sub-CU can be made available depending on the splitting paths used to reach the current sub-CU and depending on the causal neighbourhood of the current sub-CU. According to this embodiment, the state of the causal neighbourhood when estimating coding parameters for a current sub-CU is stored with the coding parameters estimated for the current sub-CU. Therefore, when the same sub-CU is further encountered, for instance when evaluating another splitting mode for a parent CU of the sub-CU, the identifier allows to retrieve the coding parameters that have been estimated for the sub-CU with a same state of causal neighbourhood as the current state of causal neighourhood if it exists in cache memory.

The identifier indexes the cache memory position where to store estimated coding parameters and to retrieve already estimated coding parameters. This identifier can be obtained by a hash function, such as well-known Murmur3, CRC, or MD5Sum. Input to the hash function is a map of computed minimal CUs. For instance, for each block of size 4×4 pixels of a CTU, a flag is set to 1 if the 4×4 block has already been coded or to 0 if not. This defines a map of causal neighborhood of the current CU to evaluate.

Such a map is illustrated on FIG. 11 showing different splitting paths to obtain a current sub-CU (filled with hatshed lines on FIG. 11) of a CTU and corresponding causal neighbourhood. On FIG. 11, the CTU comprises 8×8 blocks of 4×4 pixels, shown by dotted lines inside the CTU.

The current sub-CU is obtained according to the following splitting paths applied to a CTU:

(a) a vertical splitting of the CTU, followed by a horizontal splitting of the right CU, followed by a vertical splitting of the top sub-CU, followed by a horizontal splitting of the left sub-CU, the current sub-CU under evaluation being the resulting bottom sub-CU, (b) a vertical splitting of the CTU, followed by a horizontal splitting of the right CU, followed by an horizontal splitting of the top sub-CU, followed by a vertical splitting of the bottom sub-CU, the current sub-CU under evaluation being the resulting left sub-CU, (c) a quadtree splitting of the CTU, followed by a quadtree splitting of the top-right CU, the current sub-CU under evaluation being the resulting bottom-left sub-CU, (d) a quadtree splitting of the CTU, followed by a horizontal splitting of the top-right CU, followed by a vertical splitting of the bottom sub-CU, the current sub-CU under evaluation being the resulting left sub-CU.

In each case (a), (b), (c), and (d) the value 0 or 1 indicated for each 4×4 block of the CTU whether the 4×4 block has already been coded (value 1) or not (value 0). These maps indicate the state of the neighbourhood when estimating coding parameters for the current sub-CU according to different splitting paths.

The hash function transforms this map into an index, here the identifier disclosed above. This index is then used as cache memory address to store computed coding parameters the first time this index is encountered, or to retrieve coding parameters at subsequent times this index is encountered. According to this embodiment, this index is encountered each time a causal neighbourhood of the current sub-CU is in a state encoded in the index by the hash function.

Therefore, the computed identifier allows identifying the splitting path that has led to the current sub-CU. According to the order of candidate splitting modes evaluated as disclosed in FIG. 6, the splitting paths illustrated by FIG. 11 will be encountered in the following order: (b), (a), (d) and (c). According to this order of evaluation, when evaluating (d) and (c) splitting paths, the coding parameters estimated for the current sub-CU in the splitting path (b) can be partially re-used. According to another variant, when evaluating splitting path (c), the coding parameters estimated for the current sub-CU in the splitting path (d) can be fully re-used. According to a variant of this embodiment, the data stored for a particular state of the causal neighbourhood may comprise information such as reconstructed sample values of causal samples and/or coding modes such as intra prediction modes, motion vector predictor used. According to a variant of this embodiment, the state of the causal neighbourhood may also comprise information such as splitting depth, or sub-CU size, the number of pixels available surrounding the sub-CU. This variant allows to differentiate several causal neighbourhood for a same sub-CU wherein the blocks of the causal neighbourhood have already been coded (therefore of values are 1) but with different coding parameters.

According to the embodiment disclosed on FIG. 12, at step 1201, it is checked whether the parameter CUcache that is now associated to the current sub-CU and to the state of the causal neighborhood of the current sub-CU is 1 or not. If not, the process goes to step 602 wherein coding parameters for the current sub-CU are estimated, in a similar manner as disclosed with FIG. 6.

In step 1204, coding parameters estimated at step 602 are stored in cache memory according to the unique identifier computed at step 1201. According to this embodiment, before storing coding parameters estimated for a sub-CU, it is no more checked whether this sub-CU is a first sub-CU of a parent CU. In this way all coding parameters and state of causal neighbourhood are stored in cache memory for every sub-CU of a CU under evaluation, instead of the embodiment disclosed with FIG. 6 wherein coding parameters are stored only for the first sub-CU (step 603 on FIG. 6).

At step 1201, if the value of the parameter CUcache is 1, the process goes to step 1205, wherein already estimated coding parameters are read from the cache memory thanks to the unique identifier. The coding parameters are then restored for the current sub-CU in a similar manner as in step 605 disclosed with FIG. 6.

Furthermore, at the end of the process, the cache memory is no more cleared for the current sub-CU (no more steps 614, 615 from FIG. 6).

FIG. 13 illustrates the simplified structure of an apparatus (30) for encoding a video according to an embodiment of the present principle. Such an apparatus 30 is configured to implement the method for encoding a video according to the present principle according to any embodiments disclosed above. The functional units of the encoder apparatus 30 have been disclosed in reference to FIG. 4. The structural apparatus 30 disclosed below may be configured to implement each of these functional units individually or in combination, and according to any one of the embodiments of the principle disclosed above.

According to an embodiment, the encoder apparatus 30 comprises a processing unit PROC equipped for example with a processor and driven by a computer program PG stored in a memory MEM and implementing the method for encoding a video according to the present principle.

At initialization, the code instructions of the computer program PG are for example loaded into a RAM (not shown) and then executed by the processor of the processing unit PROC. The processor of the processing unit PROC implements the steps of the method for encoding a video which has been described here above, according to the instructions of the computer program PG.

The encoder apparatus 30 comprises a communication unit COMOUT to transmit an encoded bitstream STR to a data network.

The encoder apparatus 30 also comprises an interface COMIN for receiving a picture or a video to encode.

The invention claimed is:

1. A method, comprising encoding a video comprising, for at least one block from a picture of said video:
determining a first rate-distortion cost comprising determining, for a first splitting mode of said block into a first set of at least one first subblock, coding parameters for said at least one first subblock;
determining at least one second rate-distortion cost comprising for determining, for at least one second splitting mode of said block into at least one second set of at least one second subblock, coding parameters for said at least one second subblock of said at least one second set, wherein determining coding parameters for said at least one second subblock of said at least one second set comprises associating a parameter to said at least one first subblock having a value that indicates that at least one coding parameter of said first subblock is used for determining coding parameters for the second subblock;
determining a splitting mode for coding said block according to the first rate-distortion cost and said at least one second rate-distortion cost;

encoding said block according to said best the determined splitting mode;

wherein the parameter associated with at least one first subblock is set to said value in response to a determination that:
the second subblock is located at a same position in the picture as the first subblock;
the second subblock has a same width and same height as the first subblock; and
the first subblock and the second subblock have a same causal neighborhood comprising data used to predict the subblock or to code a coding parameter for a first or second subblock.

2. The method of claim 1 wherein said first subblock and said second subblock have a same causal neighborhood of the subblock when said first subblock is a first subblock of a first set when said first set is ordered according to a scan order.

3. The method according to claim 1, wherein said specific value indicates that coding parameters for said at least one first subblock are available and that coding parameters for said at least one second subblock are determined to be the same coding parameters as the coding parameters determined for said at least one first subblock.

4. The method according to claim 3, wherein when said coding parameters of said at least one first subblock comprises a splitting configuration of said at least one first subblock, said at least one second subblock inherits from said splitting configuration.

5. The method according to claim 1, wherein said specific value of said parameter indicates that coding parameters for said at least one second subblock are determined by searching for best coding parameters for coding said at least one second subblock from the coding parameters determined for said at least one first subblock.

6. The method according to claim 5, wherein said coding parameters for said at least one first subblock are used only when a no-splitting mode of said at least one second subblock is evaluated.

7. The method according to claim 1, further comprising:
computing an identifier for said at least one first subblock, said identifier allowing to identify said position, said width and said height of said at least one first subblock and a causal neighborhood of said at least one first subblock indicating at least whether coding parameters for a neighbor of said at least one first subblock have been previously determined,
for said at least one first subblock or said at least one second subblock, storing coding parameters determined for said at least one first subblock, in association with said identifier,
for said at least one second subblock, if said parameter associated to said at least one first subblock equals said specific value, using said identifier for reading stored coding parameters associated to said identifier, the coding parameters for said at least one second subblock being determined to be the read coding parameters.

8. An apparatus for encoding a video comprising, for at least one block from a picture of said video, a processor configured to:
determine a first rate-distortion cost comprising determining, for a first splitting mode of said block into a first set of at least one first subblock, coding parameters of said at least one first subblock;
determine at least one second rate-distortion cost comprising determining, for at least one second splitting mode of said block into at least one second set of at least one second subblock, coding parameters of said at least one second subblock of said at least one second set, wherein determining coding parameters for said at least one second subblock of said at least one second set comprises associating a parameter to said at least one first subblock having a value that indicates that at least one coding parameter of said first subblock is used for determining coding parameters for the second subblock;
determine a splitting mode for coding said block according to the first rate-distortion cost and the at least one second rate-distortion cost;
encode said block according to the determined splitting mode;
wherein the parameter associated with at least one first subblock is set to said value:
if the second subblock is located at a same position in the picture as the first subblock;
if the second subblock has a same width and same height as the first subblock; and
if the first subblock and the second subblock have a same causal neighborhood comprising data used to predict the subblock or to code a coding parameter for a first or second subblock.

9. The apparatus according to claim 8, wherein said first subblock and said second subblock have a same causal neighborhood of the subblock when said first subblock is a first subblock of a first set when said first set is ordered according to a scan order.

10. The apparatus according to claim 9, wherein said specific value indicates that coding parameters for said at least one first subblock are available and that coding parameters for said at least one second subblock are determined to be the same coding parameters as the coding parameters determined for said at least one first subblock.

11. The apparatus according to claim 9, wherein when said coding parameters of said at least one first subblock comprises a splitting configuration of said at least one first subblock, said at least one second subblock inherits from said splitting configuration.

12. The apparatus according to claim 11, wherein said specific value of said parameter indicates that coding parameters for said at least one second subblock are determined by searching for best coding parameters for coding said at least one second subblock from the coding parameters determined for said at least one first subblock.

13. The apparatus according to claim 12, wherein said coding parameters for said at least one first subblock are used only when a no-splitting mode of said at least one second subblock is evaluated.

14. The apparatus according to claim 11, further comprising a processor configured to:
compute an identifier for said at least one first subblock, said identifier allowing to identify said position, said width and said height of said at least one first subblock and a causal neighborhood of said at least one first subblock indicating at least whether coding parameters for a neighbor of said at least one first subblock have been previously determined,
for said at least one first subblock or said at least one second subblock, store coding parameters determined for said at least one first subblock, in association with said identifier,
for said at least one second subblock, if said parameter associated to said at least one first subblock equals said specific value, using said identifier for reading stored coding parameters associated to said identifier, the coding parameters for said at least one second subblock being determined to be the read coding parameters.

15. A non-transitory computer-readable medium including instructions for causing one or more processors to perform:

determining a first rate-distortion cost comprising determining, for a first splitting mode of said block into a first set of at least one first subblock, coding parameters of said at least one first subblock;

determining at least one second rate-distortion cost comprising determining, for at least one second splitting mode of said block into at least one second set of at least one second subblock, coding parameters of said at least one second subblock of said at least one second set, wherein determining coding parameters for said at least one second subblock of said at least one second set comprises associating a parameter to said at least one first subblock having a value that indicates that at least one coding parameter of said first subblock is used for determining coding parameters for the second subblock;

determining a splitting mode for coding said block according to the first rate-distortion cost and the at least one second rate-distortion cost, encoding said block according to the determined splitting mode; wherein the parameter associated to with at least one first subblock is set to said value:
  if the second subblock is located at a same position in the picture as said first subblock;
  if the second subblock has a same width and same height as said first subblock; and
  if the first subblock and the second subblock have a same causal neighborhood comprising data used to predict the subblock or to code a coding parameter for a first or second subblock.

\* \* \* \* \*

UNITED STATES PATENT AND TRADEMARK OFFICE
CERTIFICATE OF CORRECTION

PATENT NO. : 10,965,938 B2
APPLICATION NO. : 16/340127
DATED : March 30, 2021
INVENTOR(S) : Fabrice Urban, Tangi Poirier and Fabrice Leleannec It is certified that error appears in the above-identified patent and that said Letters Patent is hereby corrected as shown below:

In the Claims

Claim 1, Column 16, Line 54: replace "for determining" with --determining--

Claim 1, Column 17, Line 1: delete "said best"

Claim 15, Column 20, Line 8: replace "associated to with" with --associated with--

Signed and Sealed this
Thirtieth Day of August, 2022

Katherine Kelly Vidal
*Director of the United States Patent and Trademark Office*